United States Patent [19]

Tullock

[11] 4,083,594

[45] Apr. 11, 1978

[54] WHEEL CHAIR HOLDING MEANS

[76] Inventor: Ronald F. Tullock, 33527 Hiveley, Westland, Mich. 48185

[21] Appl. No.: 755,241

[22] Filed: Dec. 29, 1976

[51] Int. Cl.$^2$ .......................... B60T 1/14; B60N 1/02

[52] U.S. Cl. .................................. 296/1 A; 188/32; 280/179 R

[58] Field of Search ...................... 296/1 A, 19, 35 A; 188/32, 31, 69, 2 F; 280/179 R

[56] References Cited

U.S. PATENT DOCUMENTS 1,566,427 12/1925 Reneau ............................ 296/1 A 2,674,466 4/1954 Robb ................................ 188/32 X

FOREIGN PATENT DOCUMENTS 517,678 2/1931 Germany ............................ 296/19

*Primary Examiner*—Philip Goodman

*Attorney, Agent, or Firm*—Charles W. Chandler

[57] ABSTRACT

A device for holding a wheel chair in a vehicle, such as a school bus, comprising a pair of movable arms for engaging the wheel chair's large wheels. The arms are adjustable to accommodate the distance between the wheels.

7 Claims, 4 Drawing Figures

WHEEL CHAIR HOLDING MEANS

BACKGROUND OF THE INVENTION

This invention is related to means for holding a wheel chair in a relatively fixed position within a school bus, and more particularly to such a holding device which is adjustable to compensate for variations in the lateral distance between the larger wheels of conventional wheel chairs.

School buses are employed for transporting handicapped children in wheel chairs. To prevent such a wheel chair from moving within the vehicle, particularly when the vehicle is passing through a curve or making a turn, means are mounted in the bus for holding the wheel chair in position. Commercially available devices usually engage the wheels of the wheel chair to prevent its motion within the bus body.

One problem with such commercially available devices is that they do not readily compensate for variances in the lateral distance between the larger wheels of chairs made by different manufacturers. In the event of a mismatch between the holding device and the wheels, sometimes only one wheel is engaged or the wheels are insufficiently locked into position thereby endangering the safety of the occupant of the wheel chair.

SUMMARY OF THE INVENTION

The broad purpose of the present invention is to provide means that can be readily mounted in a vehicle, for holding a wheel chair in a relatively fixed position, including a pair of wheel-engaging members which can be adjusted along an elongated support so as to be locked in a spaced position that accomodates the distance between the larger wheels of the wheel chair.

Still further objects and advantages of the present invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
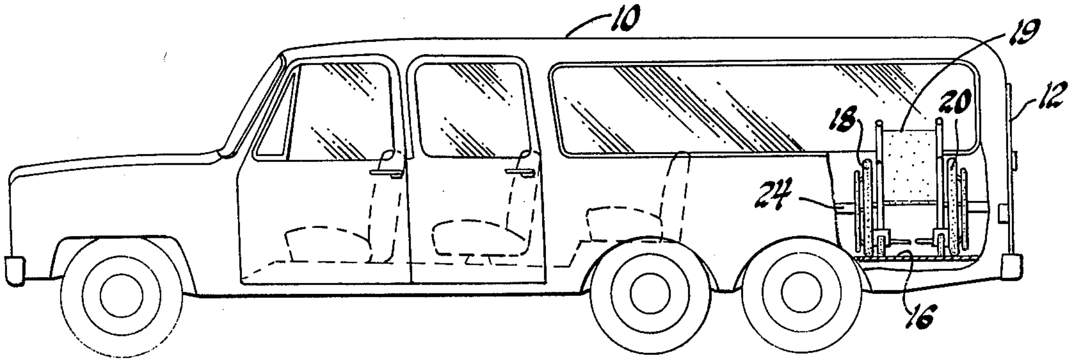
FIG. 1 is a fragmentary view of a preferred wheel chair holding means mounted within the body of a school bus.
Figure 2:
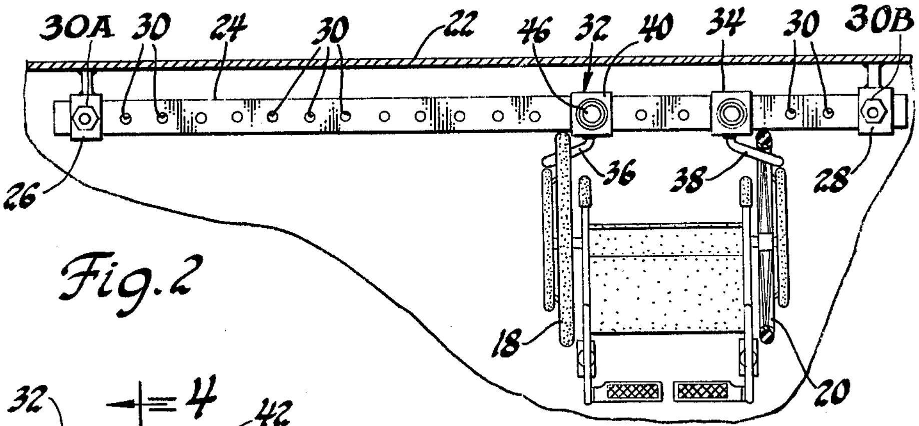
FIG. 2 is an enlarged plan view showing a wheel chair held in position by the preferred embodiment of the invention.

Now referring to the drawing, an automotive vehicle preferably school bus 10, is illustrated in FIG. 1. Bus 10 has door means 12 for receiving a conventional wheel chair 14 to a position in which it is supported on bus floor 16. Referring to FIG. 2, wheel chair 14 has a pair of laterally spaced large wheels 18 and 20 position adjacent wall 22 of bus 10. An elongated tubular support 24 is mounted by brackets 26 and 28 on wall 22 adjacent floor 16. Preferably the length of support 24 is chosen to accomodate three wheel chairs mounted side by side. Support 24 is formed with a plurality of openings 30 formed at regularly spaced intervals along the support. Bolts 30A and 30B are mounted on brackets 26 and 28, respectively, and extend through openings in support 24 to prevent the support from sliding with respect to the brackets.

A pair of wheel-engaging means 32 and 34 are mounted on support 24. Wheel-engaging means 32 has an arm 36 for engaging wheel 18, and wheel-engaging means 34 has an arm 38 for engaging wheel 20. Wheels 18 and 20 each has a rim defining an opening for a wheel-engaging arm.

Figure 3:
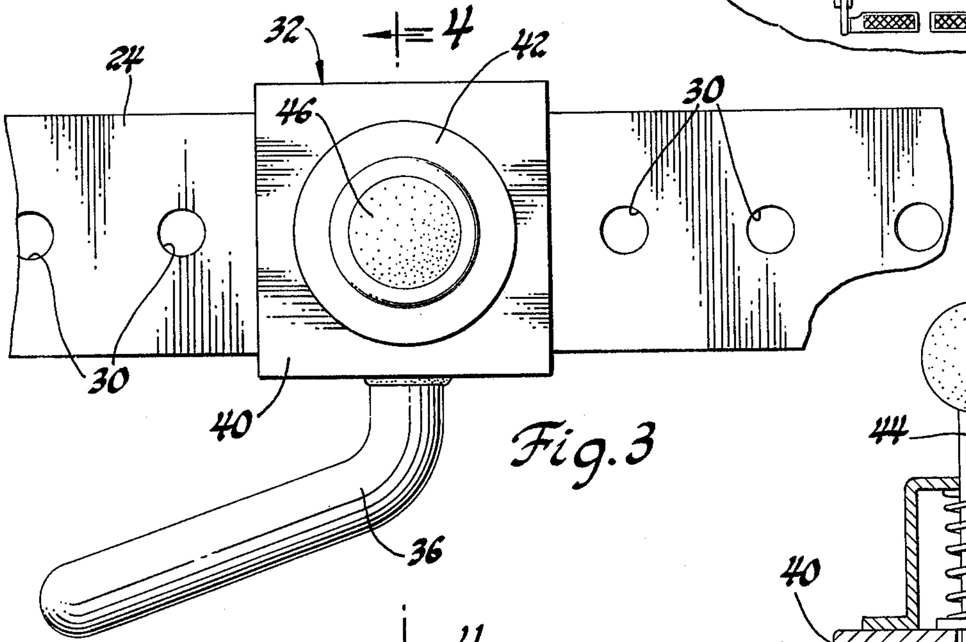
FIG. 3 is an enlarged view of one of the wheel-engaging means.
Figure 4:
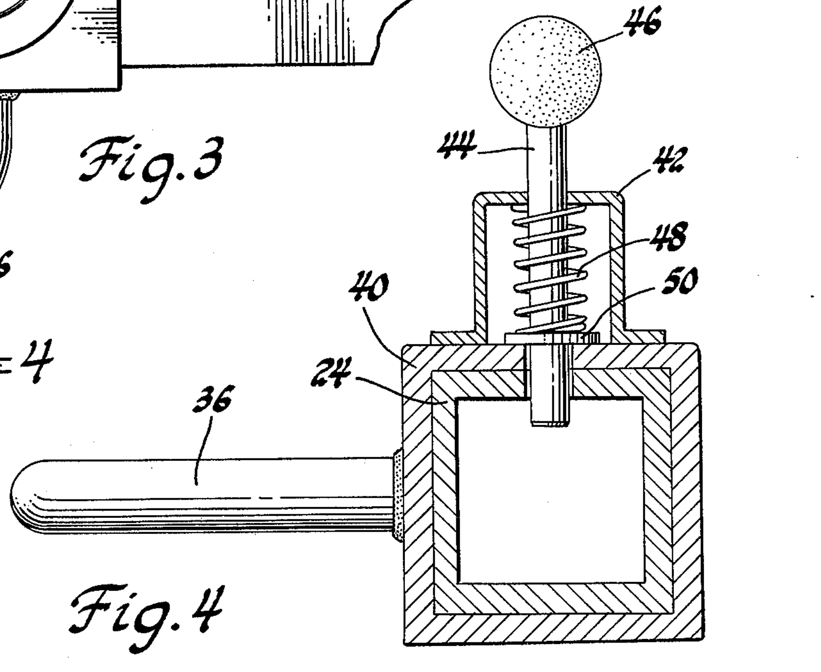
FIG. 4 is taken along lines 4—4 of FIG. 3.

Wheel-engaging means 32 and 34 are identical except with respect to their arms which are bent toward opposite directions, as illustrated in FIG. 2. Referring to FIGS. 3 and 4, wheel-engaging means 32 comprises a body 40, slidably mounted on support 24. A bracket 42, mounted on body 40, carries a pin 44 having a handle 46. Pin 44 is adapted to be received in a selected one of openings 30 to lock the wheel-engaging means against motion along the support.

A spring 48 is disposed within bracket 42 and engages a washer 50 attached to pin 44, to bias the pin toward support 24, as illustrated in FIG. 4. By raising handle 46, the user can remove pin 44 from opening 30 to permit body 40 to be moved to an adjusted position along support 24. Preferably there is a one inch spacing between each neighboring pair of openings.

Referring to FIG. 3, arm 36 is bent in the opposite direction with respect to arm 38. The lengths of the two arms are so chosen that they accommodate the one inch spacing between openings 30 to compensate for fractions of inches in the distance between the wheel chair wheels. The arms are bent to permit the user to quickly remove each arm from its respective wheel when the wheel chair is to be removed from the bus.

In operation, the two wheel-engaging means 32 and 34 are mounted closely adjacent each other. The wheel chair is then positoned adjacent the support so that wheels 18 and 20 are disposed on opposite sides of arms 36 and 38. The user then engages the wheels by raising pins 44 to move the arms to engage their respective wheels and to hold them firmly in contact with support 24. The two arms cooperate to prevent any accidental motion of the wheels away from the support.

Although a single pair of arms 36 and 38 are illustrated, preferably several pairs can be mounted on the support to accommodate several wheel chairs.

Having described my invention, I claim:

1. A combination comprising:
   - an elongated support having a plurality of regularly spaced openings along the support;
   - a wheel chair having a pair of laterally spaced rotatable wheels disposed adjacent the support, each wheel having a rim defining an opening and being rotatable about an axis of rotation;
   - first wheel-engaging means mounted on the support and being engaged with a first of said pair of wheels to prevent motion of said first wheel with respect to the support;
   - second wheel-engaging means mounted on the support and being movable toward the second of said pair of wheels along a path of motion parallel to the axis of rotation of the second wheel;
   - an arm carried by the second wheel-engaging means to be received between the opening defined by the rim of the second wheel to prevent motion thereof with respect to the support; and pin means carried by the second wheel-engaging means, said pin means being receivable in a selected opening in the support whereby the first and the second wheel-engaging cooperate to prevent motion of the wheel chair with respect to the support.

2. A combination as defined in claim 1, in which the wheel chair wheels are rotatable about an axis of rotation, and the second wheel-engaging means is movable along a path of motion parallel to said axis of rotation.

3. A combination as defined in claim 1, including a wheeled vehicle, the support being attached to said wheeled vehicle.

4. A combination as defined in claim 3, in which the support comprises an elongated tube, the openings being formed in said tube so as to be longitudinally spaced therealong.

5. A combination as defined in claim 1, in which the first wheel-engaging means is movable along said support to an adjusted position, and including pin means carried by the first wheel-engaging means so as to be receivable in a selected one of said plurality of support openings.

6. A combination as defined in claim 1, including a bias member carried on the second wheel-engaging means, the bias member being engaged with the pin means to bias it toward the support.

7. In an automotive vehicle, the combination comprising:

a wheel chair having a pair of laterally spaced rotatable wheels disposed for motion along a first path of motion, each wheel having a rim and an opening defined by said rim;

an elongated tubular support mounted in said vehicle at right angles to said first path of motion, said support being engaged with said pair of wheels and having a length greater than the distance between the laterally spaced wheels, and a plurality of longitudinally spaced openings therealong;

a first body slidably mounted on the support so as to be movable therealong towards an adjusted position; an arm carried by the first body so as to be receivable in the opening of the rim of the first of said wheels to prevent motion thereof with respect to the support and pin means carried by the body so as to be receivable in a selected opening of the support to releasably prevent motion of the body along the elongated support;

a second body slidably mounted on the support so as to be movable toward an adjusted position, an arm carried by the second body so as to be receivable in the opening of the rim of the second of said wheels to prevent motion thereof with respect to the support, and pin means carried by the second body to be receivable in a second selected opening of the support, whereby the arm carried by the first body and the arm carried by the second body cooperate in engaging the wheels to prevent motion of the wheel chair with respect to the support.

* * * * *